US012604079B2

(12) United States Patent
Irie et al.

(10) Patent No.: US 12,604,079 B2
(45) Date of Patent: Apr. 14, 2026

(54) INFORMATION PROCESSING SYSTEM AND INFORMATION PROCESSING METHOD

(71) Applicant: THE UNIVERSITY OF TOKYO, Tokyo (JP)

(72) Inventors: Hidetsugu Irie, Tokyo (JP); Shuichi Sakai, Tokyo (JP); Kazuma Michigami, Tokyo (JP); Kazutaka Tomida, Tokyo (JP)

(73) Assignee: THE UNIVERSITY OF TOKYO (JP)

( * ) Notice: Subject to any disclaimer, the term of this patent is extended or adjusted under 35 U.S.C. 154(b) by 239 days.

(21) Appl. No.: 18/273,923

(22) PCT Filed: Jan. 21, 2022

(86) PCT No.: PCT/JP2022/002301
§ 371 (c)(1),
(2) Date: Jul. 24, 2023

(87) PCT Pub. No.: WO2022/163548
PCT Pub. Date: Aug. 4, 2022

(65) Prior Publication Data
US 2024/0430559 A1     Dec. 26, 2024

(30) Foreign Application Priority Data
Jan. 29, 2021    (JP) ................................. 2021-013204

(51) Int. Cl.
*H04N 23/611*        (2023.01)
*G06F 8/41*          (2018.01)
(52) U.S. Cl.
CPC ........... *H04N 23/611* (2023.01); *G06F 8/452* (2013.01)

(58) Field of Classification Search
CPC ..... H04N 23/611; G06F 8/452; G06F 8/4441; G06F 8/51; G06F 9/44; G06F 17/17
See application file for complete search history.

(56) References Cited

U.S. PATENT DOCUMENTS

2015/0227429 A1     8/2015   Henry et al.

FOREIGN PATENT DOCUMENTS

JP        2010-252101 A     11/2010
JP        2016-524748 A     8/2016

OTHER PUBLICATIONS

Proposal for an architecture that allows dynamic control of approximation levels (Michigmai et al). (Year: 2019).*

(Continued)

*Primary Examiner* — Yogesh K Aggarwal
(74) *Attorney, Agent, or Firm* — Harness, Dickey & Pierce, P.L.C.

(57)        ABSTRACT

An information processing system has a storage unit, a determination unit, and a control unit. The storage unit stores an approximation level related to a calculation. The approximation level can be changed during execution of the calculation. During the execution of the calculation, the determination unit determines whether to carry out a first process or a second process according to a probability determined on the basis of the approximation level stored in the storage unit. The second process is an approximation process of the first process. The control unit carries out control so as to carry out the process determined by the determination unit.

11 Claims, 16 Drawing Sheets

(56)          References Cited

OTHER PUBLICATIONS

"Internet of Things", retrieved on Dec. 1, 2020, from Internet, URL https://www.ftc.gov/system/files/documents/reports/federal-trade-commission-staff-report-november-2013-workshop-entitled-internet-things-privacy/150127iotrpt.pdf> (71 pages).

Michigami, Kazuma et al., "Proposal of an architecture that can dynamically control the approximation levels.", Feb. 20, 2020, pp. 1-9, IPSJ Technical Report : Embedded Systems (EMB) 2020-EMB-O53 [online]. (25 pages).

Tomida, Kazutaka et al., "Study on a compiler framework of an architecture that can dynamically control the approximation levels.", Sep. 1, 2020, pp. 33-38, 1st volume of Lecture proceedings of 19th Forum on Information Technology FIT 2020 (18 pages).

International Search Report (English and Japanese) and Written Opinion (Japanese) issued in PCT/JP2022/002301, mailed Apr. 5, 2022; ISA/JP (12 pages).

* cited by examiner

FIG. 2

SOURCE CODE 1: EXAMPLE OF APPROXIMATION OBJECT LOOP

```
for(int i=0; i<b; i++)
{
    a[i] = func(2*i);
}
```

FIG. 3

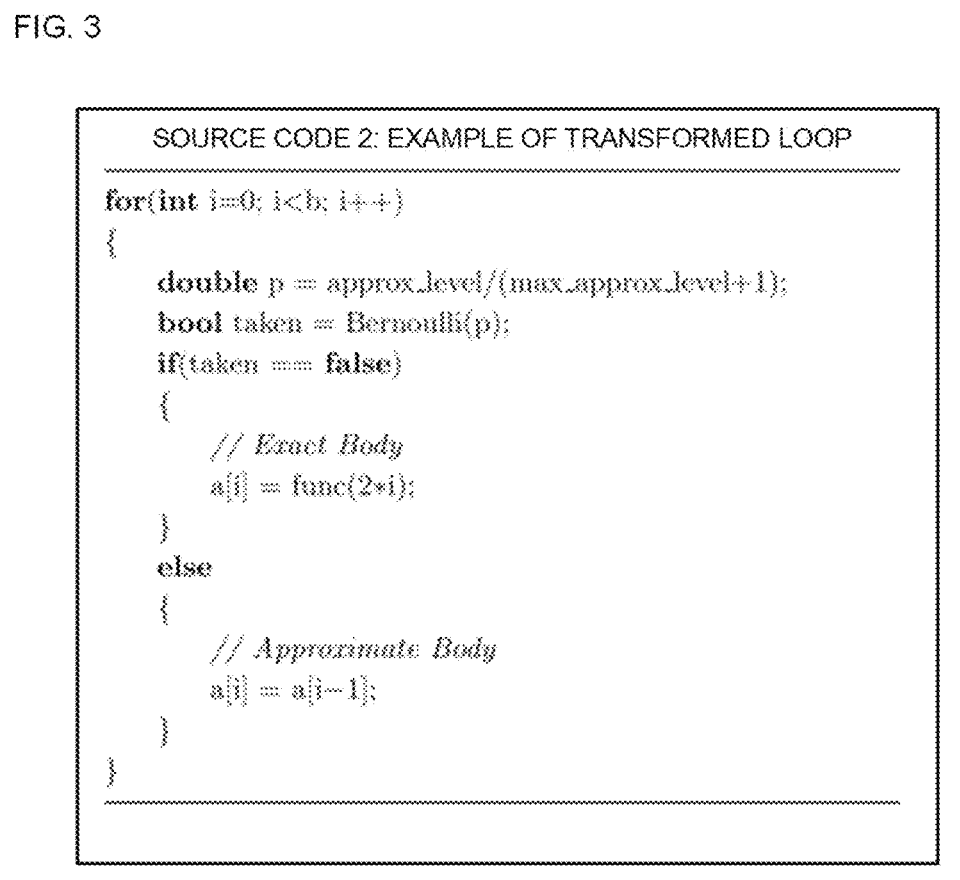

```
SOURCE CODE 2: EXAMPLE OF TRANSFORMED LOOP for(int i=0; i<b; i++)
{
    double p = approx_level/(max_approx_level+1);
    bool taken = Bernoulli(p);
    if(taken == false)
    {
        // Exact Body
        a[i] = func(2*i);
    }
    else
    {
        // Approximate Body
        a[i] = a[i-1];
    }
}
```

| ISA | RV64G |
| --- | --- |
| Fetch Width | 4 |
| Issue Width | int: 2, fp: 2, mem: 2 |
| Instruction Window | int: 32, fp: 16, mem: 16 |
| Branch Predictor | g-share, BHR: 10bit, PHT: 8KiB |
| Branch Target Buffer | 2K-entry, 4-way |
| Load Store Queue | load: 48-entry, store: 48-entry |
| L1 Instruction Cache | 32KiB, 8-way, 4-cycle hit latency |
| L1 Data Cache | 32KiB, 8-way, 4-cycle hit latency |
| L2 Data Cache | 256iKB, 4-way, 12-cycle hit latency |
| L3 Data Cache | 2MiB, 16-way, 44-cycle hit latency |
| Main Memory | 200-cycle hit latency |

FIG. 7

| BENCHMARK NAME | FIELD | DESCRIPTION | INPUT DATA |
|---|---|---|---|
| histeq | IMAGE PROCESSING | HISTOGRAM EQUALIZATION | 480 X 640 PIXEL GRAYSCALE IMAGE |
| jpeg | COMPRESSION | JPEG COMPRESSION | 512 X 512 PIXEL COLOR IMAGE |
| kmeans | MACHINE LEARNING | K-MEANS CLUSTERING | 512 X 512 PIXEL COLOR IMAGE |
| sobel | IMAGE PROCESSING | EDGE DETECTION WITH SOBEL FILTER | 512 X 512 PIXEL COLOR IMAGE |

FIG. 8

```
SOURCE CODE 3: EXAMPLE OF MEASUREMENT INTERVAL

// START MEASUREMENT
// OUTERMOST LOOP
for(int i=0; i<N; i++)
{
    // APPROXIMATION OBJECT LOOP
    for(int j=0; j<M; j++){...}
    // PROCESSING OTHER THAN APPROXIMATION OBJECT
    func();
}
// TERMINATE MEASUREMENT
```

(a) BASELINE
(APPROXIMATION LEVEL: -1)    (b) APPROXIMATION LEVEL: 6    (c) APPROXIMATION LEVEL: 12

(d) APPROXIMATION LEVEL: 18    (e) APPROXIMATION LEVEL: 24    (f) APPROXIMATION LEVEL: 30

(a) BASELINE
(APPROXIMATION LEVEL: -1)

(b) APPROXIMATION LEVEL: 6

(c) APPROXIMATION LEVEL: 12

(d) APPROXIMATION LEVEL: 18

(e) APPROXIMATION LEVEL: 24

(f) APPROXIMATION LEVEL: 30

FIG. 15
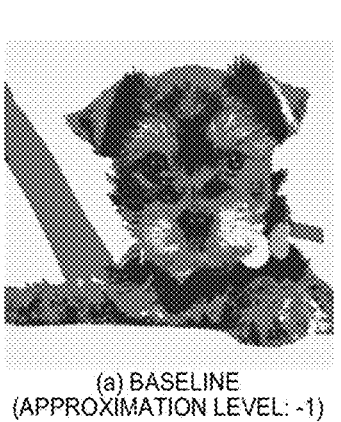
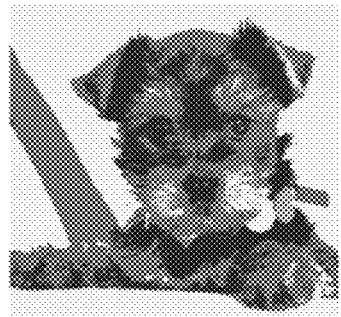
(a) BASELINE
(APPROXIMATION LEVEL: -1)
(b) APPROXIMATION LEVEL: 6
(c) APPROXIMATION LEVEL: 12
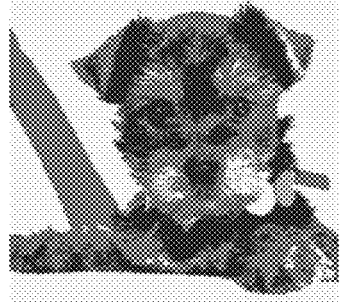
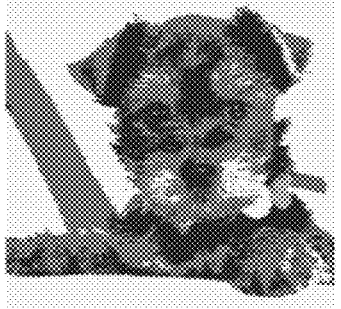
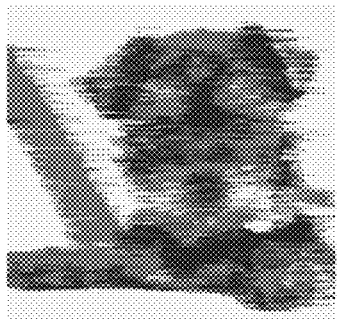
(d) APPROXIMATION LEVEL: 18
(e) APPROXIMATION LEVEL: 24
(f) APPROXIMATION LEVEL: 30

(a) BASELINE
(APPROXIMATION LEVEL: -1)

(b) APPROXIMATION LEVEL: 6

(c) APPROXIMATION LEVEL: 12

(d) APPROXIMATION LEVEL: 18

(e) APPROXIMATION LEVEL: 24

(f) APPROXIMATION LEVEL: 30

INFORMATION PROCESSING SYSTEM AND INFORMATION PROCESSING METHOD

CROSS REFERENCE TO RELATED APPLICATIONS

This application is a U.S. National Phase application under 35 U.S.C. 371 of International Application No. PCT/JP2022/002301, filed on Jan. 21, 2022, which claims priority to Japanese Patent Application No. 2021-013204, filed on Jan. 29, 2021. The entire disclosures of the above applications are expressly incorporated by reference herein.

BACKGROUND

The present invention relates to an information processing system and an information processing method.

RELATED ART

With the spread of lot (Internet of Things) technology, in which various things are connected to the Internet, computers are required to speed up processing and reduce power consumption. In Federal Trade Commission (FTC), lot refers to daily things that connect, communicate or transmit information with or between each other through the Internet ("Internet of things", (searched on Dec. 1, 2020, Internet <URL: https://www.ftc.gov/system/files/documents/reports/federal-trade-commission-staff-report-november-2013-workshop-entitled-internet-things-privacy/150127iotrpt.pdf>)).

SUMMARY

Problems to be Solved by Invention

Approximate Computing is a technology that improves computational efficiency through approximation to speed up processing and power reduction. Approximate Computing is applicable to an application that allows for slight error.

Means for Solving Problems

According to an aspect of the present invention, an information processing system is provided. The information processing system comprises a storage section, a determination section, and a controller. The storage section stores an approximation level with respect to calculation. The approximation level is changeable during execution of the calculation. The determination section is configured to determine, during execution of the calculation, whether to execute a first processing or a second processing with a probability determined based on the approximation level stored in the storage section. The second processing is an approximate processing of the first processing. The controller is configured to control in such a manner that the processing determined by the determination section is executed.

BRIEF DESCRIPTION OF DRAWINGS

FIG. 2 shows an example of source code 1.
FIG. 3 shows an example of source code 2.

FIG. 6 shows an example of a configuration of a processor to be evaluated.
FIG. 7 shows an overview of a benchmark used for evaluation.
FIG. 8 shows an example of source code 3.
FIG. 15 is a diagram showing an example of an output image (case 3).

DETAILED DESCRIPTION

Hereinafter, embodiment of the present invention will be described with reference to the drawings. Various features described in the embodiment below can be combined with each other.

A program for realizing a software in the present embodiment may be provided as a non-transitory computer readable medium that can be read by a computer or may be provided for download from an external server or may be provided so that the program can be activated on an external computer to realize functions thereof on a client terminal (so-called cloud computing).

In the present embodiment, the "section" may include, for instance, a combination of hardware resources implemented by a circuit in a broad sense and information processing of software that can be concretely realized by these hardware resources. Further, various information is performed in the present embodiment, and the information can be represented by, for instance, physical values of signal values representing voltage and current, high and low signal values as a set of binary bits consisting of 0 or 1, or quantum superposition (so-called qubits), and communication/calculation can be executed on a circuit in a broad sense.

Further, the circuit in a broad sense is a circuit realized by combining at least an appropriate number of a circuit, a circuitry, a processor, a memory, or the like. In other words, it is a circuit includes application specific integrated circuit (ASIC), programmable logic device (e.g., simple programmable logic device (SPLD), complex programmable logic device (CPLD), field programmable gate array (FPGA)), or the like.

Figure 1:
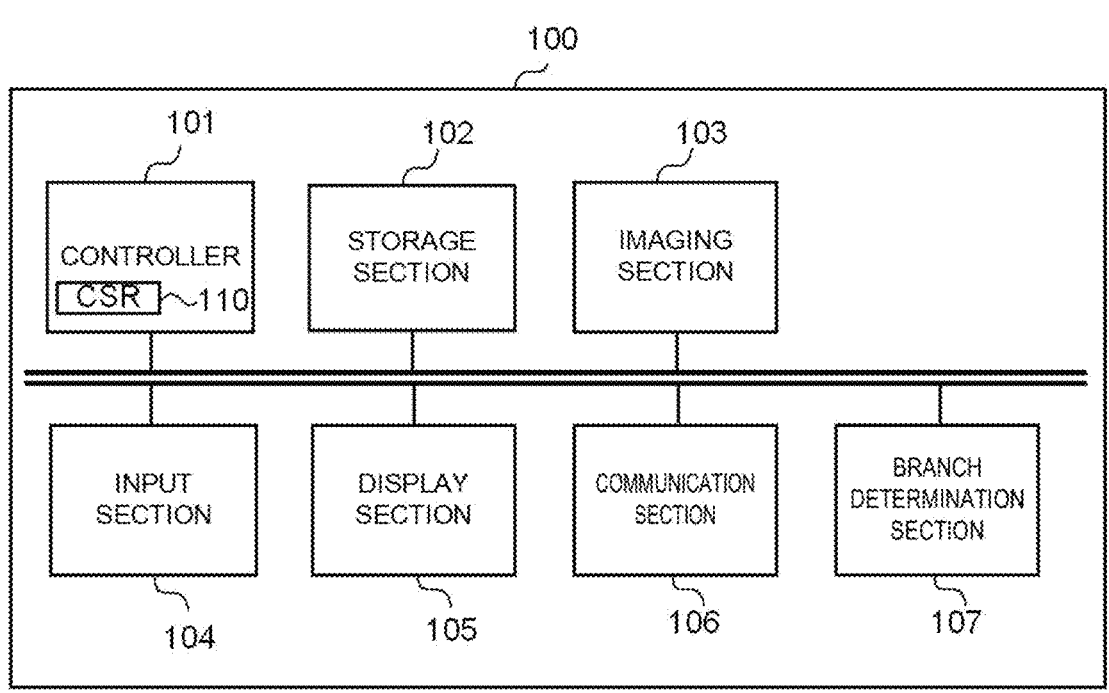
FIG. 1 shows an example of a hardware configuration of an information processing apparatus.

First Embodiment (Hardware Configuration)
FIG. 1 shows an example of a hardware configuration of an information processing apparatus 100. The information processing apparatus 100 is an example of an information processing system. The information processing system may be configured of one information processing apparatus 100 or may configured of two or more information processing apparatuses 100. Further, the information processing system may include apparatus other than the information processing apparatus 100. The information processing apparatus 100 may be a personal computer, a smartphone, a tablet computer, a game machine, a wearable computer, a dedicated machine, or the like.

The information processing apparatus 100 includes, as hardware configuration, a controller 101, a storage section 102, an imaging section 103, an input section 104, a display section 105, a communication section 106, and a branch determination section 107. Further, the controller 101 includes a CSR (Control and Status Register) 110.

The controller 101 is, for example, a central processing unit (CPU), which controls entire information processing apparatus 100. The CSR 110 stores an approximation level, which is a value indicating aggressiveness of approximation in calculation. The approximation level can be changed during execution of the calculation. The storage section 102 is a ROM (Read Only Memory), or RAM (Random Access Memory), or HDD (Hard Disk Drive), etc., which stores a program and data used for the controller 101 to execute processing based on the program. The controller 101 executes processing based on a program stored in the storage section 102 to realize function of the information processing apparatus 100.

The imaging section 103 is, for instance, a camera or the like capturing image of a subject. The subject is, for instance, an operator or a user of the information processing apparatus 100. The input section 104 is, for instance, a keyboard, a mouse, etc., and inputs information to the controller 101 based on user operation. The display section 105 is, for instance, a display, etc., and outputs information under control of the controller 101.

The communication section 106 connects the information processing apparatus 100 to a network and manages communication between the information processing apparatus 100 and other apparatus. The branch determination section 107 determines whether to execute first processing or second processing with a probability determined based on the approximation level stored in the CSR 110. The second processing is an approximate processing of the first processing. The controller 101 is configured to control in such a manner that the processing determined by the branch determination section 107 is executed.

(Motivation)

Approximate Computing is a technique that improves computational efficiency through approximation. This technique can be applied to an application that allows for slight error. Examples include multimedia information processing and machine learning. These applications may not require high calculation accuracy due to noise in input data itself or limitation of human perception. In such cases, Approximate Computing can achieve faster computation and lower power consumption at expense of error. One of challenges in extending the applicability of this technology is to keep error within an allowable range. The allowable range often varies dynamically depending on subjectivity of user.

For instance, when quality of an output image changes due to approximation, to what degree the quality is acceptable may depend on perception of a user. If the allowable range is set statically based on a user with a relatively narrow allowable range, the approximation may not be effective enough for a user with a relatively wide allowable range. In view of this, the present specification proposes an architecture that supports dynamic control of calculation accuracy by hardware. In the present specification, the approximation level is defined as "a value that indicates how aggressively a hardware executes approximation." The information processing apparatus 100 maintains the approximation level in the CSR 110 and dynamically sets by external input or detection of hardware, thereby enabling execution with appropriate calculation accuracy.

In the present specification, as one of the approximation approaches operating on the proposed architecture, a loop approximation approach called "Loop Body Switching" that enables stepwise control of computational accuracy is proposed. This approach executes an approximate loop body instead of an original exact loop body with a probability determined by approximation level. An overhead for loop body selection and branching is reduced by adding "Stochastic Branch Instruction" that is a dedicated branch instruction and "Branching Determination Section 107" that is a hardware apparatus for selecting the loop body.

In evaluating the approach herein, the proposed architecture is implemented in a simulator and the Loop Body Switching is applied to four benchmarks. Number of execution cycles and error for each approximation level of 32 steps are measured to indicate that stepwise approximation is possible. In addition, effectiveness of the branch determination section 107 is evaluated by comparing the case with the branch determination section 107 and the case without the branch determination section 107.

Contributions of the present specification are as follows.

Proposal of an architecture capable of dynamically controlling approximation level Proposal of Loop Body Switching that enables stepwise control of calculation accuracy Proposal of stochastic branch instruction and branch determination section 107 supporting Loop Body Switching Investigation of change in error and number of execution cycles for approximation level using four benchmarks Investigation of change in number of execution cycles due to presence or absence of the branch determination section 107

Proposed Approach (1) Motivation

One of challenges of Approximate Computing is to reduce execution time and power consumption accordingly while keeping error within an allowable range. When applying this technology to application such as image processing, the allowance range for error often changes dynamically due to individual and situational differences in human perception. If the allowance range is narrow, approximation may not be sufficiently effective, but if the allowance range is loosened, the application may be difficult to utilize. The gain obtained by Approximate Computing would be greater if it becomes possible to execute with calculation accuracy according to actual quality required by a user. There are two main issues to achieve this.

How to execute the same binary with different calculation accuracies step by step?

How to estimate the quality needed by user?

If the first issue is resolved, the second can be resolved most simply by taking feedback directly from the user. The first issue can be addressed with an approximation approach in which calculation accuracy can be changed by internal register indicating rewritable calculation accuracy during execution and value thereof. For instance, either an original exact loop body or an approximate loop body is executed for each iteration of a loop, and calculation accuracy can be dynamically changed by determining a probability of selecting the approximate loop body by an internal register.

(2) Overview

Following is an overview of a proposed approach in the present specification. The proposed approach is roughly divided into three points as follows.

Architecture enables dynamically control of approximation level

Loop approximation method called "Loop Body Switching" executed on the proposed architecture "Stochastic branch instruction" and "branch determination section 107" supporting the Loop Body Switching The first is an architecture having an approximation level value as CSR 110. The approximation level is a value indicating how aggressively a hardware may approximate.

The second is a loop approximation approach capable of changing calculation accuracy for executing stochastic approximate loop.

The third is a hardware mechanism for improving performance by supporting stochastic branching of the loop approximation approach. The hardware mechanism is configured of stochastic branch instruction for branching with probability according to the approximation level and the branch determination section 107 that for determining a branch direction of the instruction.

(3) Approximation Level Control

The CSR 110 holding the value of the approximation level is a 32-bit register and can have a maximum of $2^{32}$ levels. A range of approximation level is set from 0 to N−1 when the approximation level is at N stage. The approximation level may be rewritten by an instruction in a program, an external interrupt, or hardware detection. An approximation approach utilizing approximation level is designed to reduce the number of execution cycles and power consumption instead of decreasing calculation accuracy as the approximation level is increased.

Hereinafter, implementation according to the present specification will be described. An approximation level is represented by 5 bits and has 32 levels from 0 to 31. Approximation level 0 means no approximation at all. The approximation level can be changed by rewriting the CSR value by an instruction in the program.

(4) Loop Body Switching

This approach performs approximation by generating an approximate loop body from the original exact loop body and executing the approximate loop body in some iterations. A loop structure is transformed and a branch instruction is inserted in such a manner that either loop body can be selected for each iteration. To show operation of Loop Body Switching, an example of an approximation object loop is shown in source code 1, and a loop after being transformed by approximation is shown in source code 2. FIG. 2 shows an example of the source code 1, and FIG. 3 shows an example of the source code 2. In other words, the controller 101 specifies approximation object processing from the source code of the program, and transforms the specified approximation object processing into first processing and second processing with respect to the approximation object processing.

The approximation object processing is, for example, a loop part of the source code. Here, an example of specified approximation object processing from the source code is processing of "Example of approximation object processing" in FIG. 2. An example of the first processing is processing of //Exact Body part in FIG. 3. An example of the second processing is processing of //Approximate Body part in FIG. 3.

The transformed loop is configured of three parts: a loop body selection section, an original exact loop body, and an approximate loop body. The loop body selection section stochastically determines which loop body to execute and performs conditional branching. The loop body is selected by sampling a Boolean value from Bernoulli distribution that depends on "approx level" variable. In the approximate loop body, processing for approximating the original exact loop body is performed. In this example, interpolation is performed using NN method. In the present specification, hardware executes processing of the loop body selection section. First, the selection probability of the approximate loop body is determined by the hardware CSR 110, not by a variable in the program. This facilitates dynamic external rewriting and reference from the hardware. Branching of the loop body selection is performed by a dedicated stochastic branch instruction and the branch determination section 107 rather than by an ordinary conditional branch instruction. The stochastic branch instruction is an instruction in which a branch direction is determined by the branch determination section 107 at the time of fetching, completely preventing occurrence of branch prediction error.

Figure 4:
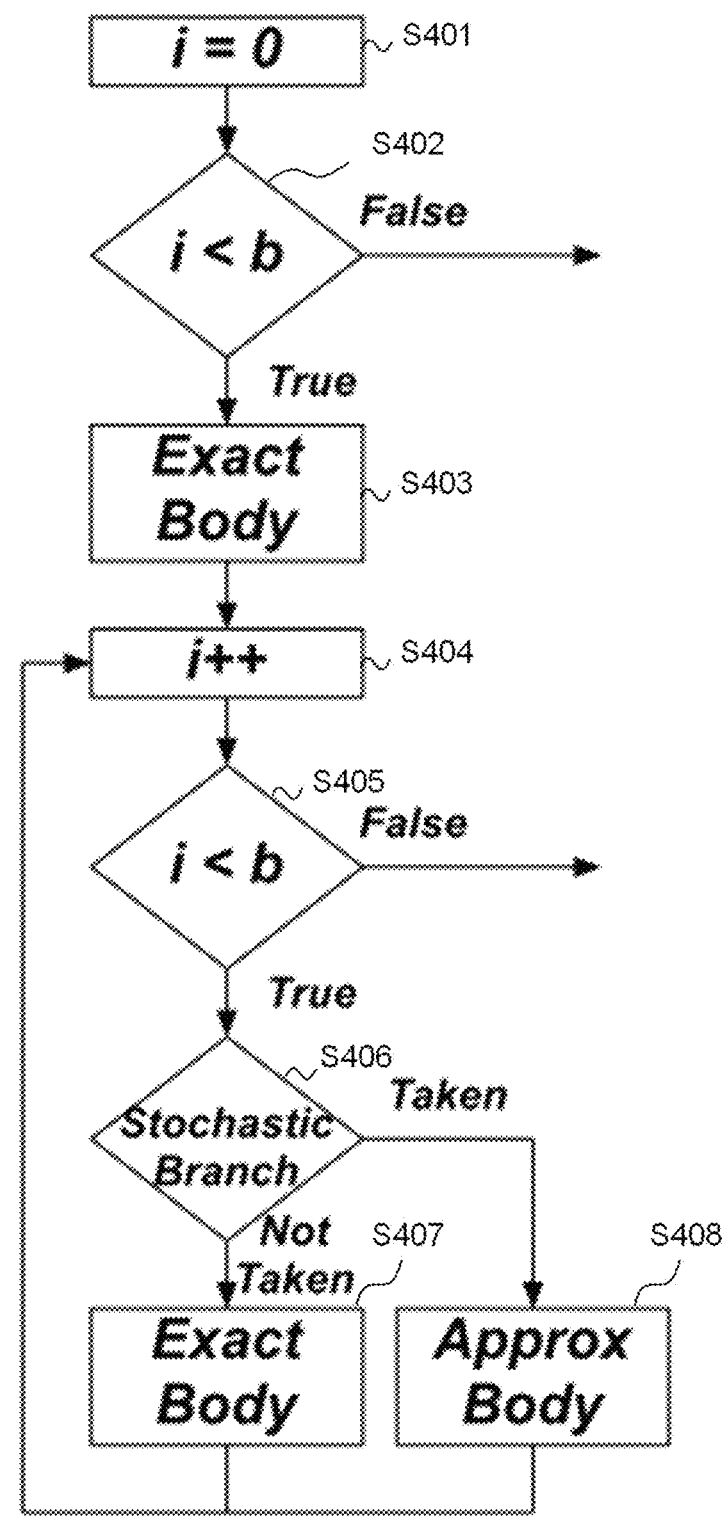
FIG. 4 is a flowchart of an approximated loop.

A flowchart of an approximated loop is shown in FIG. 4. FIG. 4 is a flowchart of the approximated loop.

Hereinafter, processing in FIG. 4 will be described.

At S401, the controller 101 substitutes 0 (zero) for variable i.

At S402, the controller 101 determines whether i is less than b. b is, for instance, a constant that defines a maximum rotation of the loop. If i is determined to be less than b, the controller 101 advances the processing to S403. If i is determined to be not less than b, the controller 101 terminates the processing shown in FIG. 4.

At S403, the controller 101 executes Exact Body processing. An example of the Exact Body processing is the Exact Body processing shown in FIG. 3.

At S404, the controller 101 increases value of variable i by 1.

At S405, the controller 101 determines whether i is less than b. b is, for instance, a constant that defines a maximum rotation of the loop. If i is determined to be less than b, the controller 101 advances the processing to S406. If i is determined to be not less than b, the controller 101 terminates the processing shown in FIG. 4.

At S406, the controller 101 executes a stochastic branch processing. If it is decided to execute the Exact Body processing stochastically, the controller 101 advances the processing to S407. If it is decided to execute Approx Body processing, the controller 101 advances the processing to S408.

At S407, the controller 101 executes the Exact Body processing. An example of the Exact Body processing is the Exact Body processing shown in FIG. 3.

At S408, the controller 101 executes the Approx Body processing. An example of the Approx Body processing is the Approx Body processing shown in FIG. 3.

In the approximate loop body, either interpolation processing is executed, or nothing is executed. The interpolation processing performs interpolation of array value by NN method. In the NN method, a previous iteration value is used as an interpolation value, thus proper interpolation cannot be performed in an initial iteration. For this reason, the loop structure is transformed in such a manner that the original exact loop body is always executed in the initial iteration. Without hardware support, the overhead of the loop body selection section is large when executing the Loop Body Switching. First, an overhead for sampling a branch direction from the Bernoulli distribution corresponding to the approximate level is generated. Furthermore, the branch determination section 107 needs to apply stochastic branch without knowing information of the approximate level. In such a case, the overhead is further increased due to the occurrence of branch prediction error.

(5) Stochastic Branch Instruction

A stochastic branch instruction is a branch instruction in which a value of next program counter (PC) is determined by hardware during execution. A branch target address is a value obtained by adding the PC value to an immediate value of an operand. A branch prediction error does not occur because a branch direction is determined at the time of fetching. Next, the implementation according to the present specification will be described. In the execution stage, the branch target address is calculated. Regardless of the branch direction, write to Branch Target Buffer (BTB) is surely performed. If necessary, information on the branch direction is given to the branch determination section 107. The latency is 1.

(6) Branch Determination Section

Figure 5:
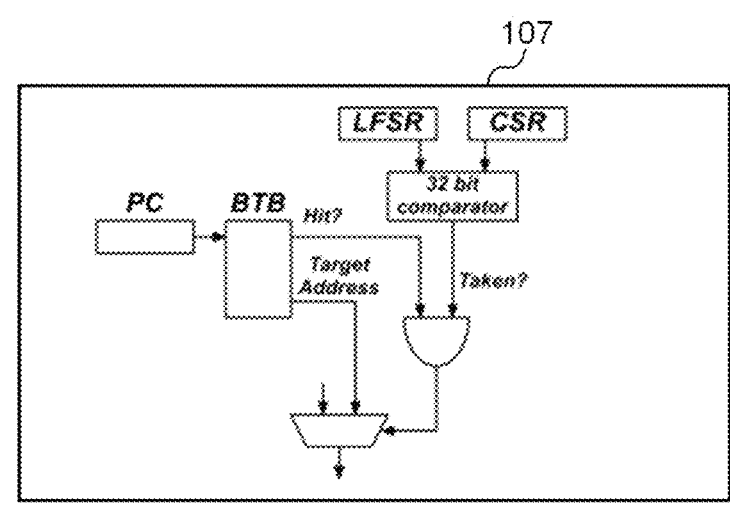
FIG. 5 shows an example of a branch determination section.

The branch determination section 107 is an apparatus determining the next PC of the stochastic branch instruction. The branch direction is determined by a branch direction determinator that outputs 1 (branching) or 0 (not branching). In the case of branching, a target address obtained from BTB becomes the next PC. The BTB is shared with the branch determination section 107. In the present specification, the Bernoulli branch determinator described later is utilized. FIG. 5 shows a state of PC determination when using the Bernoulli branch determinator. FIG. 5 is a diagram showing an example of the branch determination section 107. The branch determination section 107 executes pseudo sampling from the Bernoulli distribution. A linear feedback shift register (LFSR) being a hardware pseudo random number generator is provided inside. An output value is determined by Equation (1) when the approximate level is nbit and the LFSR is mbit.

[Equation 1]

$$\text{approx\_level} \cdot 2^{m-n} \geq \text{random\_value} \quad (1)$$

However, as

[Equation 2]

$$1 \leq n \leq m$$

random_value is a value of LFSR and approx_level indicates approximation level. Here, assuming that the LFSR outputs $2^m-1$ values excluding 0 and that the probability of occurrence of each value is uniform, the probability that Equation (1) is true is represented by Equation (2).

[Equation 3]

$$P(\text{true}) = \frac{\text{approx\_level} \cdot 2^{m-n}}{2^m - 1} \quad (2)$$

$$\approx \frac{\text{approx\_level}}{2^n}$$

$$= \frac{\text{approx\_level}}{\text{max\_approx\_level} + 1} \quad (3)$$

Equation (3) is an approximate equation obtained by assuming

[Equation 4]

$$2^m \gg 1$$

Evaluation Method

(1) Simulation Environment

An architecture proposed for Onikiri2 (*1), a cycle-accurate simulator, is implemented and evaluated.

(*1) Ryota Shiotani, Masahiro Goto, and Shuichi Sakai: "Design and Implementation of the Processor Simulator Processor Simulator 'Onigiri-2'," Symposium on Advanced Computing Systems and Infrastructure, SACSIS 2009 (2009).

Configuration of the processor to be evaluated is shown in FIG. 6. FIG. 6 is a diagram showing an example of configuration of the processor to be evaluated. Based on the configuration, a processor implemented with the above approach is simulated.

(2) Benchmark

FIG. 7 shows an overview of the benchmark utilized for evaluation. FIG. 7 is a diagram showing an overview of the benchmark utilized for evaluation. PER-FECT (*2) is a benchmark suite for embedded calculation configured by applications in various fields.

(*2) Barker, K., Benson, T., Campbell, D., Ediger, D., Gioiosa, R., Hoisie, A., Kerbyson, D., Manzano, J., Marquez, A., Song, L., Tallent, N. and Tumeo, A.: "PERFECT (Power Efficiency Revolution For Embedded Computing Technologies) Benchmark Suite Man-ual," Pacic Northwest National Laboratory and GeorgiaTech Research Institute (2013).

AxBench (*3) is a benchmark suite configured of applications suitable for approximation.

(*3) Yazdanbakhsh, A., Mahajan, D., Esmaeilzadeh, H. and Lot-Kamran, P.: AxBench: "A Multiplatform Bench-mark Suite for Approximate Computing," IEEE Design & Test (2017).

A total of four benchmarks are selected: his-teq from PERFECT, jpeg, kmeans, and sobel from AxBench. Output of these benchmarks is an image, and the output quality can be visually confirmed. In a measurement interval, the approximate level is fixed to measure the number of execution cycles and error for each approximate level.

A start position and an end position of measurement of the number of execution cycles are set before and after the approximation object loop or before and after an outermost loop including the approximation object loop. An example of using the outermost loop including the approximation object loop as a measurement interval is shown in source code 3. FIG. 8 shows an example of the source code 3. As shown in the example, processing other than the approximation object loop may be included in the measurement interval.

(3) Error Evaluation

Normalized Root Mean Square Error (NRMSE) is used as an index of error. If number of pixels in an image is n, i-th pixel values of original image and approximate image are $p_i$ and $p'_i$, respectively, and upper limit value and lower limit value of the pixel values are $p_{max}$ and $p_{min}$, respectively, the error is represented by the following equation.

[Equation 5]

$$NRMSE = \frac{\sqrt{\frac{1}{n}\sum_i^n (p_i - p'_i)^2}}{p_{max} - p_{min}} \quad (4)$$

Result

Figure 9:
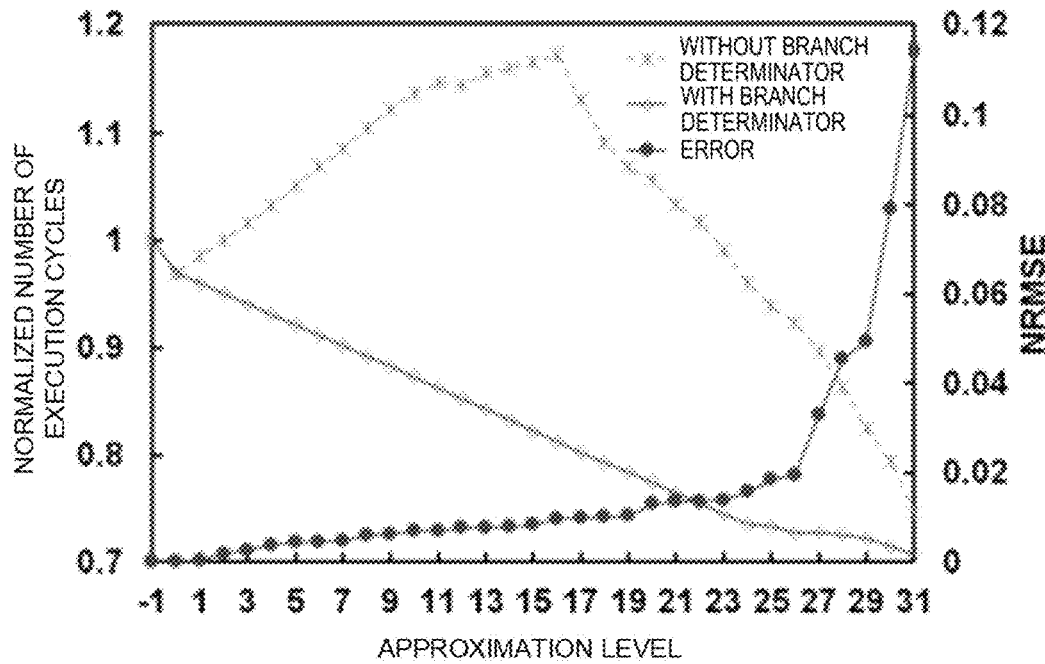
FIG. 9 is a diagram showing number of execution cycles and result of error (case 1).
Figure 10:
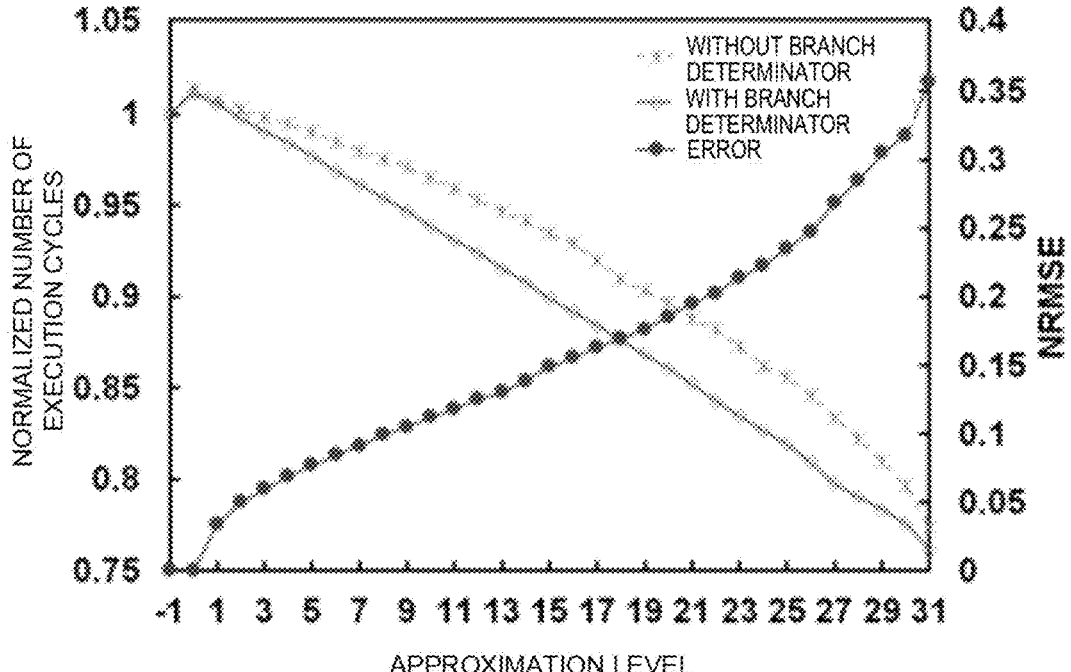
FIG. 10 is a diagram showing number of execution cycles and result of error (case 2).
Figure 11:
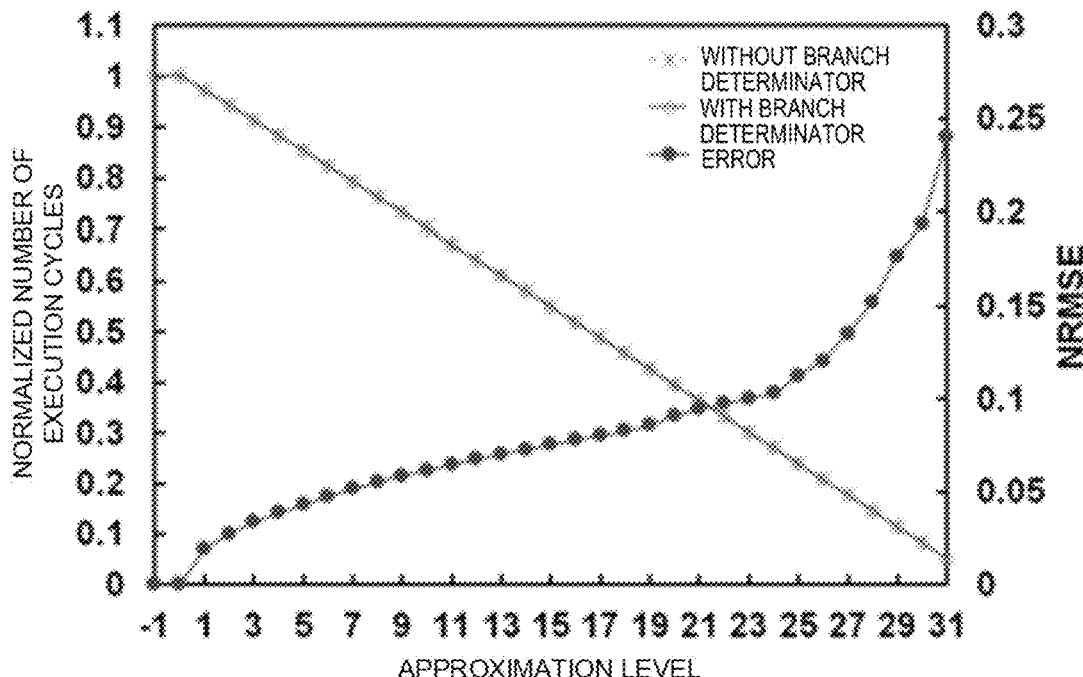
FIG. 11 is a diagram showing number of execution cycles and result of error (case 3).
Figure 12:
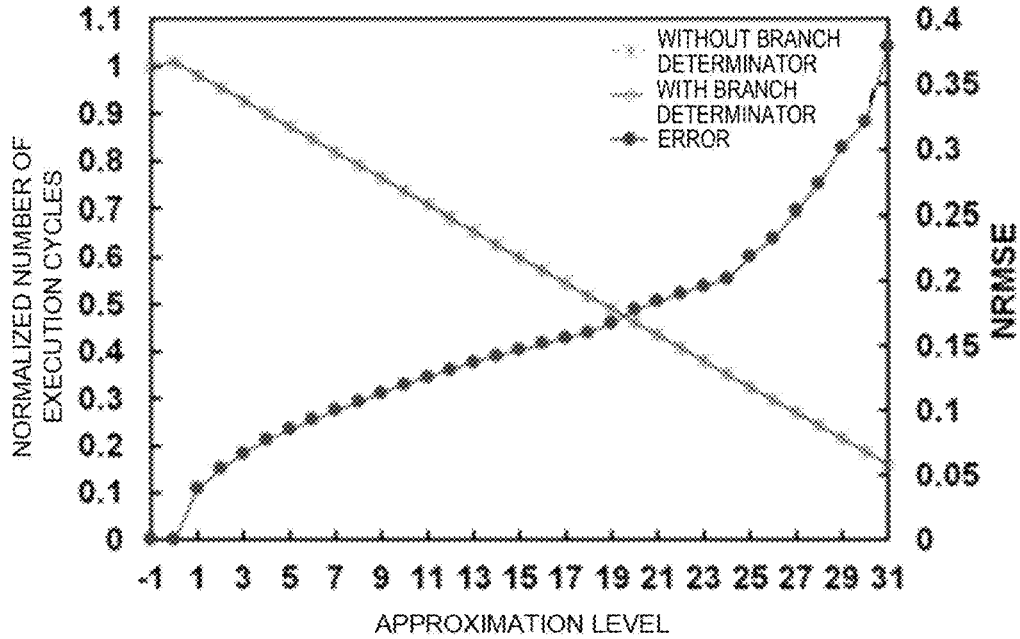
FIG. 12 is a diagram showing number of execution cycles and result of error (case 4).
Figure 13:
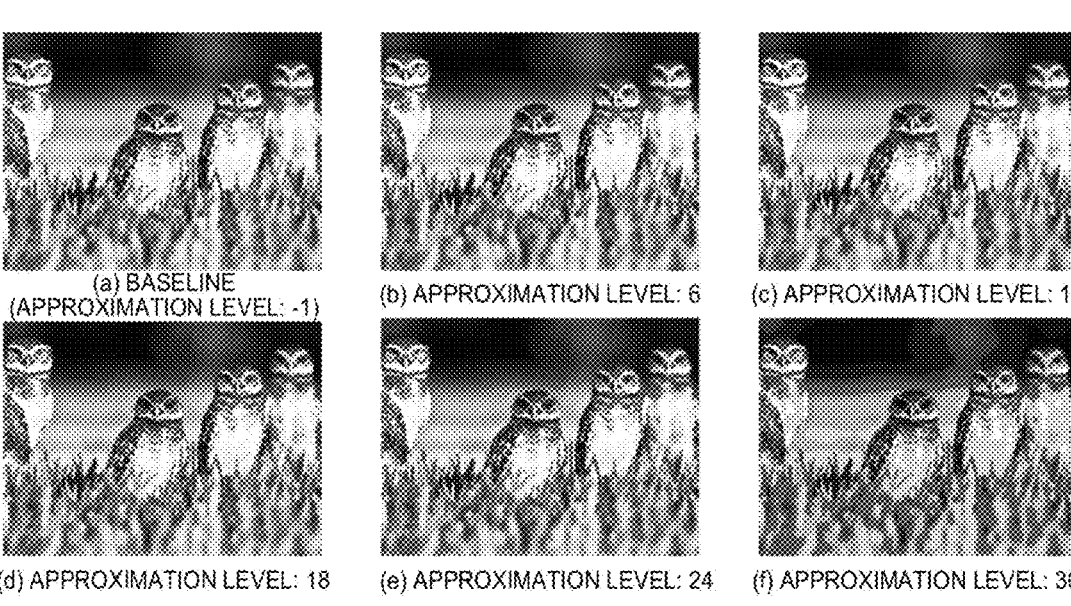
FIG. 13 is a diagram showing an example of an output image (case 1).
Figure 14:
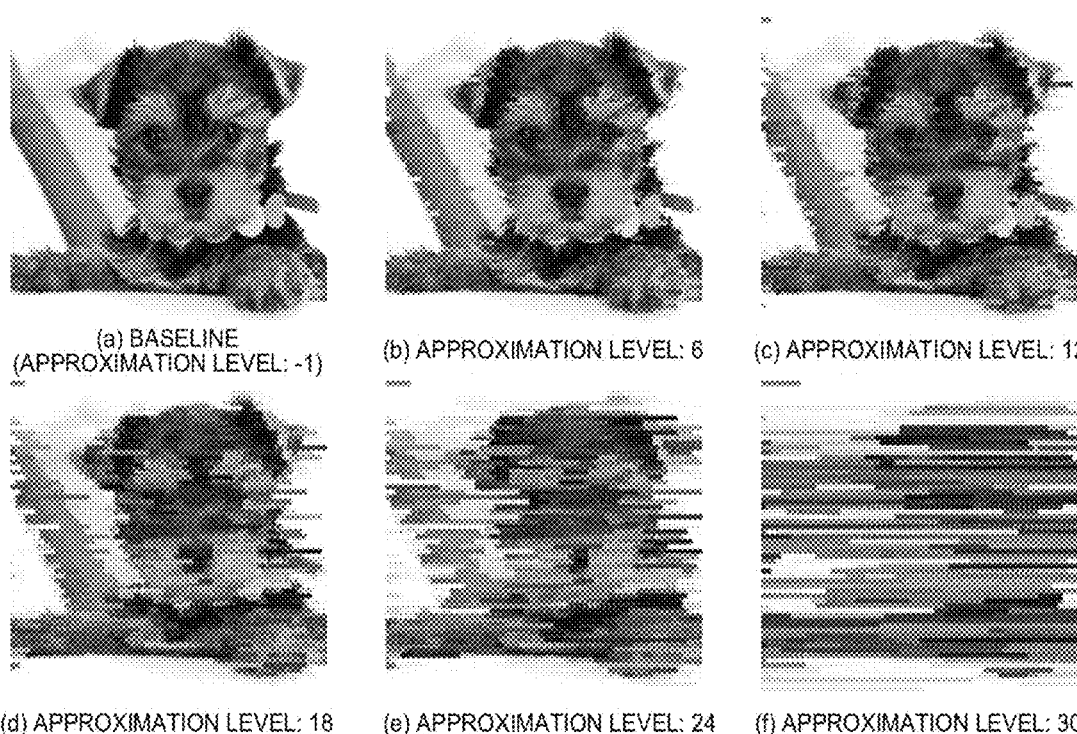
FIG. 14 is a diagram showing an example of an output image (case 2).
Figure 16:
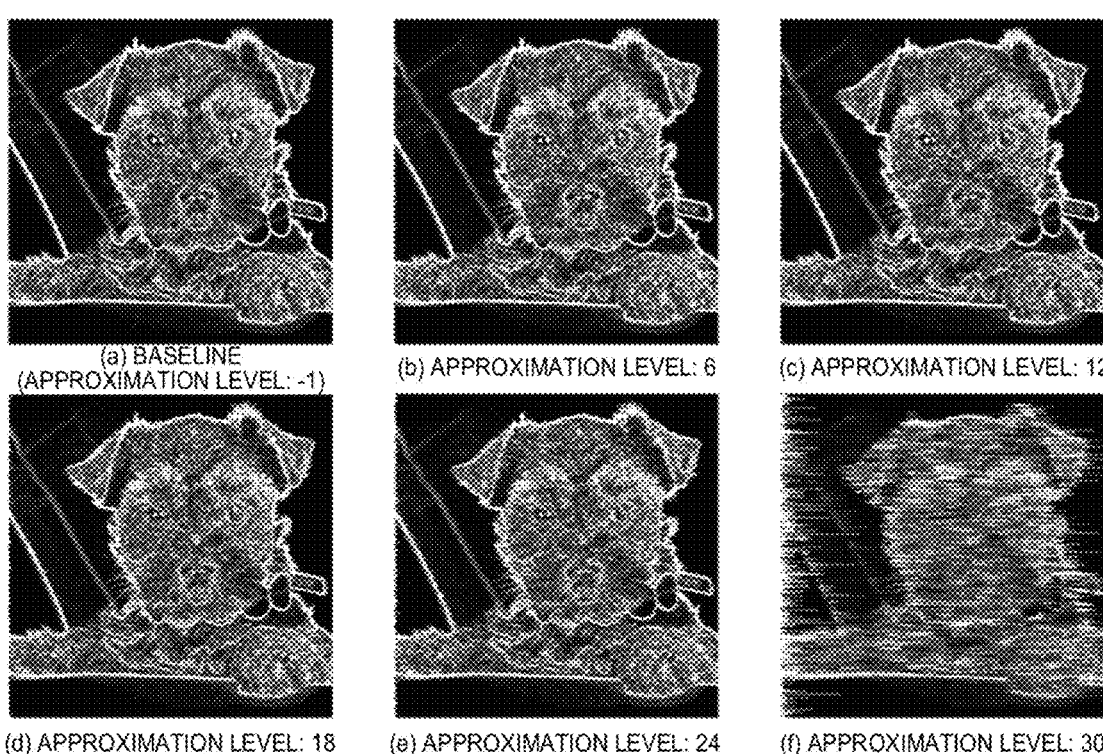
FIG. 16 is a diagram showing an example of an output image (case 4).

FIG. 9 (histeq), FIG. 10 (jpeg), FIG. 11 (kmeans), and FIG. 12 (sobel) show the number of execution cycles and results of errors. FIG. 9 is a diagram showing the number of execution cycles and result of error (case 1). FIG. 10 is a diagram showing the number of execution cycles and result of error (case 2). FIG. 11 is a diagram showing the number of execution cycles and result of error (case 3). FIG. 12 is a diagram showing the number of execution cycles and result of error (case 4). A horizontal axis indicates approximation level, a left vertical axis indicates a normalized number of execution cycles normalized by the number of execution cycles at approximation level 1, and a right vertical axis indicates the NRMSE. The approximation level 1 means a binary execution result generated without editing an assembly for approximation. Therefore, the approximation level 1 is utilized as a baseline. Further, FIG. 13 (histeq), FIG. 14 (jpeg), FIG. 15 (kmeans), and FIG. 16 (sobel) show output images when executing at approximation levels −1, 6, 12, 18, 24, and 30. FIG. 13 is a diagram showing an example of the output image (case 1). FIG. 14 is a diagram showing an example of the output image (case 2). FIG. 15 is a diagram showing an example of the output image (case 3). FIG. 16 is a diagram showing an example of the output image (case 4).

(1) Trade-Off Between Error and Number of Execution Cycles

A result shown in the drawing indicates that when using the branch determination section 107, the error increases and the number of execution cycles decreases with increasing approximation level in a range of approximation levels 0 to 31. This indicates that it is possible to control the trade-off between error and the number of execution cycles by controlling the approximation level. Combined with the approach of dynamically changing the approximation level, it is possible to execute the simulation with actual required output quality.

(2) Change in Number of Execution Cycles

Note the number of execution cycles with presence of branch determination section 107. Except for the change from approximation level 26 to approximation level 27 in FIG. 9 (histeq), the number of normalized execution cycles decreases monotonically with increasing approximation level in the range from approximation level 0 to 31. The degree of decrease varies for each benchmark, with the number of normalized execution cycles at approximation level 31 being 0.71 for histeq, 0.76 for jpeg, 0.051 for kmeans, and 0.16 for sobel. According to Equation (2), the probability of executing the approximate loop body at approximation level 31 is about 0.97, which means that the approximate loop body with less processing should be selected with a high probability, but the decrease in the number of execution cycles for histeq and jpeg is small. The decrease in the number of execution cycles of histeq is small because the processing of the original exact loop body is small and the number of execution cycles is not reduced much even if an approximate loop body is executed. The decrease in the number of execution cycles of jpeg is small because the measurement interval includes processing other than the approximation object loop. This is equivalent to including func( ) processing unrelated to approximation, such as in the source code 3.

Except for FIG. 13 (histeq), the number of execution cycles increases at small approximation levels, such as approximation level 0, compared to the case where approximation approach is not applied. This is because the increase in the number of execution cycles due to transformation of the loop structure for approximation or insertion of stochastic branch instruction is greater than the decrease in the number of execution cycles due to approximation.

(3) Effect of the Branch Determination Section 107

Next, the case with the branch determination section 107 and the case without the branch determination section 107 are compared. FIG. 9 (histeq) and FIG. 10 (jpeg) show a large difference in the number of normalized execution cycles, while FIG. 11 (kmeans) and FIG. 12 (sobel) show almost no difference. In the case without the branch determination section 107, the maximum number of execution cycles increases by 44.5% for histeq, 4.6% for jpeg, 0.9% for kmeans, and 5% for sobel compared to the case with the branch determination section 107. The difference in the amount of increase is caused by the difference in the magnitude of the number of execution cycles for the execution of the original exact loop body. When the number of execution cycles taken to execute the original exact loop body is large, influence of the branch prediction error penalty is relatively small. Therefore, even if the utilization of the branch determination section 107 reduces the branch prediction error, the influence is hardly seen. In addition, for all benchmarks and for all approximation levels, the number of normalized execution cycles in the case with the branch determination section 107 is less than or equal to the number of execution cycles in the case without the branch determination section 107. This indicates that when using the branch determination section 107, there is no performance degradation due to the use of the branch determination section 107. Further, it can be seen from FIG. 10 (jpeg) and FIG. 11 (kmeans) that the difference between the cases without and with the branch determination section 107 becomes greater as the approximation level increases at first, but the difference becomes smaller during execution. This is due to bias of the branch direction of the stochastic branch instruction decreases during the change from approximation level 0 to approximation level 16, while the bias of the branch direction increases during the change from approximation level 16 to approximation level 31. When the branch direction is determined by pseudo-random numbers, general branch determination section 107 is more likely to apply with a bias in the branch direction. For this reason, the difference between the change in the approximation level without and with the branch determination section 107 becomes greater at first, but becomes smaller with the approximate level near the center as a boundary.

(4) Change in Error

Trend of monotonically increasing error with increasing approximation level is common to all benchmarks. In addition, there is a common trend to see greater change in vicinity of the minimum and maximum approximation levels, while the rest shows a generally linear trend. The output image shows that the greater the approximation level, the greater the deterioration is. However, degree of quality degradation differs. In FIG. 9 (histeq), degradation is insignificant as the approximation level increases. In FIG. 10 (jpeg), on the other hand, degradation is significant that it is impossible to distinguish what is shown in the image at approximation level 30.

Second Embodiment

In a second embodiment, an example in which a controller 101 changes approximation level stored in CSR 110 will be described.

The controller 101 may change the approximation level stored in the CSR 110 based on user operation via an input section 104, etc.

Further, the controller 101 may change the approximation level stored in the CSR 110 based on viewpoint of the user. More specifically, the controller 101 may estimate viewpoint of the user based on the captured image of the user, and change the approximation level stored in the CSR 110 based on the estimated viewpoint of the user. For example, the controller 101 executes image recognition processing based on a captured image of an operator of the information processing apparatus 100 taken by the imaging section 103, so as to estimate the viewpoint of the user. The controller 101 then changes the approximation level stored in the CSR 110 based on the estimated viewpoint of the user. For example, in the information processing apparatus 100, two or more programs are operated, and the controller 101 decreases the approximation level with respect to the program outputting processing result in front of the viewpoint of the user (close to the baseline), and increases the approximation level with respect to the program outputting processing result other than in front of the viewpoint of the user (away from the baseline).

By executing such processing, both execution time and commodity power are reduced in exchange for calculation accuracy of a program that is not confirmed by a user, and calculation accuracy can be maintained by the program that is confirmed by the user.

Note that the above description is only an example. For instance, if there are two or more user, it is possible to estimate viewpoints of more than one user and change approximate level stored in CSR 110 based on the estimated viewpoints of more than one user. For example, the controller 101 may decrease the approximation level with respect to the program outputting processing result in front of the viewpoint of many users among two or more users (i.e., users with a predetermined ratio or more among the two or more users) (close to the baseline), and may increase the approximation level with respect to the program outputting processing result other than in front of the viewpoint of many user (away from the baseline).

Further, the controller 101 may change the approximation level stored in the CSR 110 based on an input value of the information processing apparatus 100. For instance, the controller 101 may increase approximation level with respect to a program processing an input value when amount of input value is greater than a threshold value (away from the baseline), and decrease the approximation level with respect to the program processing the input value when the amount of input values is less than the threshold value (close to the baseline).

The controller 101 may change the approximation level stored in the CSR 110 based on a time slot. For example, the controller 101 learns, by machine learning, a time slot during which a result of processing of a program is not used and a time slot during which the result of processing of the program is used. Then, based on a learned result, the controller 101 may increase the approximation level of the time slot in which the result of the processing of the program is not used (away from the baseline), and decrease the approximation level of the time slot in which the result of the processing of the program is used (close to the baseline).

Furthermore, the controller 101 may change the approximation level stored in the CSR 110 based on processing load of an information processing system. For example, the controller 101 may increase the approximation level (away from the baseline) if CPU utilization of a program operating in the entire information processing apparatus 100 exceeds a threshold value, and decrease the approximation level (close to the baseline) in other cases. The CPU utilization is merely an example, other indicators of processing load, such as memory utilization, power consumption, etc. may be utilized as well.

Other Embodiment

The above-described embodiment may be implemented as an information processing method. The information processing method is an information processing method executed by an information processing system. The information processing method includes a determination step and a control step. The information processing system comprises a CSR 110. The CSR 110 stores an approximation level. In the determination step, a branch target of processing is determined whether to a first processing or a second processing is executed with a probability determined based on the approximation level stored in the CSR 110. The second processing is an approximation processing of the first processing. In the control step, processing is selected in such a manner that the processing of the branch target determined by the determination step is executed.

APPENDIX

In addition, the present invention may be provided in each of the following aspects.

The information processing system, wherein: the controller is configured to specify approximation object processing from source code of a program, and transform the specified approximation object processing into the first processing and the second processing with respect to the approximation object processing.

The information processing system, wherein: the approximation object processing is a loop part of the source code.

The information processing system, wherein: the approximation level is a value indicating aggressiveness of approximation in the calculation.

The information processing system, wherein: the controller is configured to change the approximation level stored in the storage section based on user operation.

The information processing system, wherein: the controller is configured to change the approximation level stored in the storage section based on viewpoint of a user.

The information processing system, wherein: the controller is configured to estimate viewpoint of a user based on a captured image of the user, and change the approximation level stored in the storage section based on the estimated viewpoint of the user.

The information processing system, wherein: the controller is configured to change the approximation level stored in the storage section based on an input value of the information processing system.

The information processing system, wherein: the controller is configured to change the approximation level stored in the storage section based on a time slot.

The information processing system, wherein: the controller is configured to change the approximation level stored in the storage section based on a processing load of the information processing system.

An information processing method executed by an information processing system including a storage section storing an approximation level with respect to calculation, the approximation level being changeable during execution of the calculation, the method comprising: a determination step of determining a branch target of processing whether to execute a first processing or a second processing with a probability determined based on the approximation level stored in the storage section, wherein the second processing is an approximate processing of the first processing; and a control step of controlling in such a manner that the processing determined by the determination step is executed.

Of course, the present invention is not limited thereto.

The above-described embodiments and variations may be implemented in any combination.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

What is claimed is:

1. An information processing system, comprising:
a storage section storing an approximation level with respect to calculation, the approximation level being changeable during execution of the calculation;
a determination section configured to determine, during execution of the calculation, whether to execute a first processing or a second processing with a probability determined based on the approximation level stored in the storage section, the second processing being an approximate processing of the first processing; and
a controller configured to control in such a manner that the processing determined by the determination section is executed.

2. The information processing system according to claim 1, wherein:
the controller is configured to specify approximation object processing from source code of a non-transitory computer readable storage medium storing a program, and transform the specified approximation object processing into the first processing and the second processing with respect to the approximation object processing.

3. The information processing system according to claim 2, wherein:
the approximation object processing is a loop part of the source code.

4. The information processing system according to claim 1, wherein:
the approximation level is a value indicating aggressiveness of approximation in the calculation.

5. The information processing system according to claim 1, wherein:
the controller is configured to change the approximation level stored in the storage section based on user operation.

6. The information processing system according to claim 1, wherein:
the controller is configured to change the approximation level stored in the storage section based on viewpoint of a user.

7. The information processing system according to claim 6, wherein:
the controller is configured to estimate viewpoint of a user based on a captured image of the user, and change the approximation level stored in the storage section based on the estimated viewpoint of the user.

8. The information processing system according to claim 1, wherein:
the controller is configured to change the approximation level stored in the storage section based on an input value of the information processing system.

9. The information processing system according to claim 1, wherein:
the controller is configured to change the approximation level stored in the storage section based on a time slot.

10. The information processing system according to claim 1, wherein:
the controller is configured to change the approximation level stored in the storage section based on a processing load of the information processing system.

11. An information processing method executed by an information processing system including a storage section storing an approximation level with respect to calculation, the approximation level being changeable during execution of the calculation, the method comprising:
a determination step of determining a branch target of processing whether to execute a first processing or a second processing with a probability determined based on the approximation level stored in the storage section, wherein the second processing is an approximate processing of the first processing; and
a control step of controlling in such a manner that the processing determined by the determination step is executed.

* * * * *